A. DEHNE.
COMBINED STEP AND JOURNAL BEARING.
APPLICATION FILED DEC. 30, 1908.
924,747.
Patented June 15, 1909.
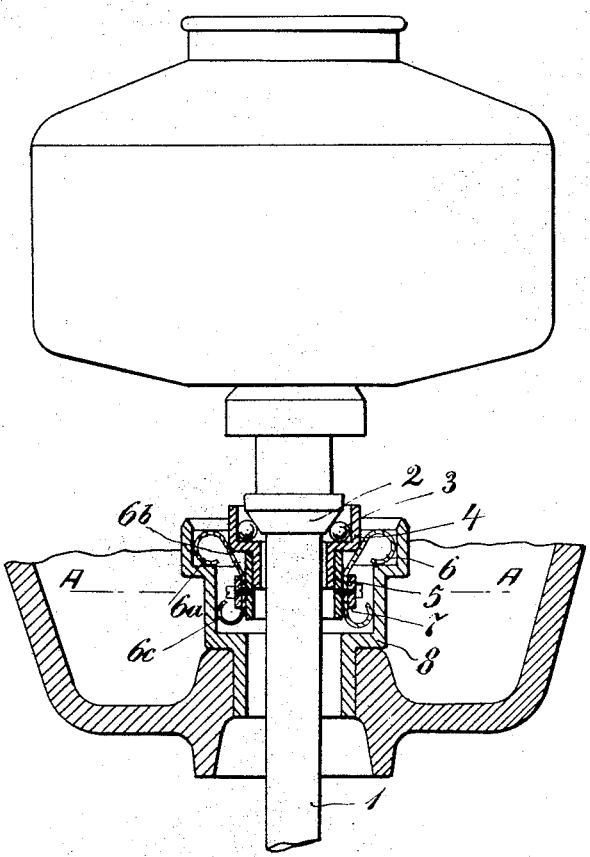
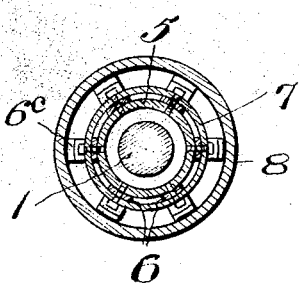

UNITED STATES PATENT OFFICE.

ADOLPH DEHNE, OF FRANKFORT-ON-THE-ODER, GERMANY.

COMBINED STEP AND JOURNAL BEARING.

No. 924,747.  Specification of Letters Patent.  Patented June 15, 1909.

Application filed December 30, 1908. Serial No. 469,996.

*To all whom it may concern:*

Be it known that I, ADOLPH DEHNE, a citizen of the German Empire, residing at Beeskowerstrasse 11-12, Frankfort-on-the-Oder, Germany, have invented certain new and useful Improvements in Combined Step and Journal Bearings; and I do hereby declare the following to be a full, clear, and exact description of the invention.

My invention relates to improvements in combined resilient step and journal bearings for vertical shafts revolving at high speeds, such for example as shafts of centrifugal machines. And the object of the improvements is to provide a bearing which is adapted to take up the weight of the bowl and the pressure of the vertical shaft, and thereby to permit a noiseless rotation of the bowl.

A further object of the improvements is to so construct the bearing, that a special step bearing at the bottom end of the shaft is dispensed with, which step bearing is substituted by a guide for the shaft. For this purpose the bearing is resiliently supported in a vertical and horizontal direction.

For the purpose of explaining the invention, an embodiment of the principles thereof is illustrated in the accompanying drawing, in which—

Figure 1 represents a vertical cross-section of the bearing of a centrifugal machine, and Fig. 2 represents a horizontal cross-section taken on the line A—A of Fig. 1.

In the example shown, the vertical shaft 1 of the bowl of the centrifugal machine is provided with a flange 2 having a conical lower face, providing an upper ball race for balls 3. The lower ball race is provided by a ring 4 forming the bearing box. The latter is surrounded by a sleeve 5 having several longitudinal grooves about its circumference. Within the said grooves, springs 6 are secured to the sleeve 5 and to the ring 4 by means of a ring 7. The whole construction is located within a cup shaped sleeve 8 secured within the frame of the centrifugal machine.

The shape of the springs 6 is such, that they are adapted to take up the vertical shocks of the shaft and the horizontal oscillations of the bowl of the centrifugal machine. If, for example, the driving mechanism for the machine is irregularly operated, a pressure is exerted on the shaft and thereby, through the intermediary of the conical flange 2 and the balls 3, on the ring 4. The latter, however, is supported on the springs 6. Therefore, the variations of the pressure are transmitted to the coiled ends 6ª of the springs, and the arms 6ᵇ are slightly bent. When the pressure is released, the ball race is moved backward in its normal position by the resiliency of the springs. In case of lateral oscillations of the bowl, the pressure is transmitted to the coiled ends 6ᶜ of the springs. The springs may have any suitable form. But in any case, only one of the ends thereof must have a bottom support, while the opposite ends are not supported in a vertical direction.

As the resiliently supported and perfectly balanced ball race provides the only support for the whole construction, the conical flange, the balls, and the ball race have a uniform bearing support on one another, so that a noiseless operation of the shaft is obtained.

I claim:

In a journal bearing for vertical shafts, in combination, a bearing box comprising a ring having a ball race and a sleeve surrounding said ring, a cup shaped sleeve having an annular shoulder surrounding said bearing box, and springs secured near their lower ends to the bearing box and having coiled upper ends laterally supported in the annular shoulder of said cup-shaped sleeve, said springs forming a resilient supporting means for said bearing box, substantially as described.

In testimony whereof I hereunto affix my signature in the presence of two witnesses.

ADOLPH DEHNE.

Witnesses:
 HENRY HASPER,
 WOLDEMAR HAUPT.